United States Patent
Bongartz et al.

(10) Patent No.: US 10,801,134 B2
(45) Date of Patent: Oct. 13, 2020

(54) RIBBON YARN

(71) Applicant: PHP FIBERS GMBH, Obernburg am Main (DE)

(72) Inventors: Marianne Bongartz, Mönchengladbach (DE); Andreas Flachenecker, Essen (DE); Christian Vieth, Wörth (DE); Joachim Cziollek, Elsenfeld (DE); Alexander Thienel, Sulzbach (DE)

(73) Assignee: PHP FIBERS GMBH, Obernburg am Main (DE)

( * ) Notice: Subject to any disclaimer, the term of this patent is extended or adjusted under 35 U.S.C. 154(b) by 958 days.

(21) Appl. No.: 14/377,636

(22) PCT Filed: Feb. 8, 2013

(86) PCT No.: PCT/EP2013/052596
§ 371 (c)(1),
(2) Date: Aug. 8, 2014

(87) PCT Pub. No.: WO2013/117728
PCT Pub. Date: Aug. 15, 2013

(65) Prior Publication Data
US 2015/0167207 A1    Jun. 18, 2015

(30) Foreign Application Priority Data
Feb. 10, 2012 (EP) .................... 12154856

(51) Int. Cl.
| | | |
|---|---|---|
| *D02J 1/18* | (2006.01) | |
| *D04H 3/009* | (2012.01) | |
| *D04H 3/12* | (2006.01) | |
| *D04H 3/011* | (2012.01) | |
| *D04H 3/04* | (2012.01) | |
| *B65H 51/005* | (2006.01) | |
| *D01G 9/00* | (2006.01) | |
| *D02G 3/40* | (2006.01) | |
| *D02G 3/44* | (2006.01) | |
| *D02G 3/48* | (2006.01) | |
| *D06B 1/02* | (2006.01) | |
| *B60R 21/235* | (2006.01) | |

(52) U.S. Cl.
CPC .............. *D02J 1/18* (2013.01); *B65H 51/005* (2013.01); *D01G 9/00* (2013.01); *D02G 3/402* (2013.01); *D02G 3/446* (2013.01); *D02G 3/48* (2013.01); *D04H 3/009* (2013.01); *D04H 3/011* (2013.01); *D04H 3/04* (2013.01); *D04H 3/12* (2013.01); *D06B 1/02* (2013.01); *B60R 2021/23514* (2013.01); *B65H 2701/313* (2013.01); *D10B 2331/02* (2013.01); *D10B 2331/04* (2013.01); *D10B 2505/02* (2013.01); *D10B 2505/124* (2013.01); *Y10T 428/249921* (2015.04); *Y10T 428/2973* (2015.01)

(58) Field of Classification Search
CPC ......... D02J 1/18; B65H 51/005; D04H 3/009; D04H 3/011; D06M 15/285; D06M 15/21
USPC ................................ 427/177, 179, 175, 170
See application file for complete search history.

(56) References Cited

U.S. PATENT DOCUMENTS

| | | | | |
|---|---|---|---|---|
| 4,874,658 A | * | 10/1989 | Sasaki ..................... | B29C 70/16 428/220 |
| 4,894,105 A | * | 1/1990 | Dyksterhouse ......... | B29C 70/54 156/166 |
| 5,002,823 A | * | 3/1991 | Chen ......................... | C08J 5/06 428/300.1 |
| 5,806,155 A | * | 9/1998 | Malaney ................. | D04H 18/04 28/104 |
| 5,989,660 A | * | 11/1999 | Moriwaki ............. | B60R 21/235 139/384 R |
| 2003/0070745 A1 | | 4/2003 | Van Den Aker | |
| 2004/0043213 A1 | | 3/2004 | Tonon | |
| 2008/0115882 A1 | | 5/2008 | Van Den Aker | |
| 2009/0114306 A1 | | 5/2009 | Van Den Aker | |
| 2012/0015135 A1 | * | 1/2012 | Beraud ................. | B29C 70/086 428/74 |
| 2013/0026740 A1 | | 1/2013 | Finn et al. | |

FOREIGN PATENT DOCUMENTS

| | | | |
|---|---|---|---|
| EP | 0 259 870 | 3/1988 | |
| EP | 0259870 A2 * | 3/1988 | ............. B29C 70/16 |
| EP | 0 711 247 B1 | 10/1997 | |
| EP | 1 153 957 A2 | 11/2001 | |
| EP | 1 839 831 | 10/2007 | |
| EP | 1 908 575 | 4/2008 | |
| EP | 2 374 923 | 10/2011 | |
| JP | A-03-276845 | 12/1991 | |
| JP | A-04-015142 | 1/1992 | |
| JP | A-04-015143 | 1/1992 | |
| JP | A-04-015144 | 1/1992 | |
| WO | WO 01/83345 | 11/2001 | |

OTHER PUBLICATIONS

International Search Report dated May 10, 2013 issued in International Application No. PCT/EP2013/052596 (with translation).

* cited by examiner

*Primary Examiner* — Michael P Wieczorek
(74) *Attorney, Agent, or Firm* — Oliff PLC

(57) ABSTRACT

A method is disclosed for fabricating a ribbon yarn, the method including: spreading the yarn such that not more than five filaments are lying over one another, fixing the yarn by forming a matrix of one or more fixatives, winding the fixed yarn, wherein the fixative or fixatives are selected from a group consisting of copolyamides, copolyesters and silicones and also mixtures or blends thereof. Also described is the ribbon yarn and the application of the ribbon yarns for airbag fabrics, as a tire reinforcement and in textile construction.

10 Claims, 3 Drawing Sheets

BT as a function of temperature

Tenacity-/elongation-dependent parameters at different temperatures:
Comparison of EN 140HRT dtex 1880f280 (bobbin 47) and ribbon yarn with
1.8% copolyamide 2A application (bobbin 256)

RIBBON YARN

BACKGROUND

The present invention relates to a method for producing a ribbon yarn and to the use of such a yarn, e.g. for producing airbag fabrics or tire reinforcements.

Ribbon yarns for the production of airbags are known for example from EP-A-2 374 923. In this document, a plurality of yarns made of individual fibers are treated with an "activatable" additive or a coating and subsequently subjected to an activation step so that the yarns assume a flat configuration.

Airbags are typically constructed as woven fabrics and are initially folded and/or rolled into a narrow package and inserted into an airbag module behind a cover.

The folded airbag is connected to a gas generator which is designed such that a large volume of gas is introduced directly following receipt of a so-called impact signal. In view of the very short time frame within which an airbag is inflated in order to provide sufficient protection for a vehicle occupant in the case of a crash, substantial flow rates are achieved and the gas is also, depending on the type of generator used, very hot. For these reasons, it is common to provide the fabric of the airbag with a surface coating in order to achieve at least a short term heat resistance and to impede the permeability for hot particles.

Commonly, woven fabrics made of polyamide material are used for this purpose, and the fabric is provided with a silicone coating in order to achieve a good seal tightness with respect to gases and particles. At the same time, this design enables a relatively good aging resistance of the airbag.

The disadvantage in this design is the considerable use of material for the production of a relatively sealed fabric as well as for the coating. Due to the increasing prices for the synthetic polymers, generally based on petroleum, for the production of the filaments, to the steadily increasing use of airbags in automobiles of all types, and to the extreme cost pressure within the automotive industry, possibilities must be sought for producing an airbag for which the material expense is as limited as possible—without detriment to performance. Added to this is the demand by the automotive industry for reductions in weight and space requirements for all parts used, thus also for the airbag.

JP 03 276845 (Bando Chem Ind Ltd.) proposes a method for producing a ribbon yarn which contains the steps: provision of a yarn made of multifilaments, spreading the yarn, fixing the yarn by forming a matrix consisting of an elastomer, and winding the yarn, wherein the spreading is carried out such that not more than five filaments overlie one another.

In JP 04 015143 from the same applicant, a ribbon yarn is provided with an elastomer based on silicone rubber or resorcinol formaldehyde latex (RFL) in a so-called dipping facility.

Finally, US 2004/0043213 describes the spreading of carbon fibers in order to obtain as large a surface as possible for coating with RFL, in order to thereby guarantee that filaments located in the inside of the filament bundle are also coated with the reagent.

BRIEF SUMMARY

The methods and the ribbon yarns of the prior art obtained from said methods still have, however, the disadvantage that the adhesion of the filaments to the "activatable" additives or coatings in part leaves a lot to be desired, in particular when it comes to the use of filaments made of polymers that do not have a good adhesion per se, such as polyester.

By means of the present invention, this problem is solved by a method for producing a ribbon yarn comprising the following steps:
a) provision of a yarn made of multifilaments based on polyamide and/or polyester,
b) spreading the yarn such that not more than five filaments overlie one another,
c) fixing the yarn by forming a matrix consisting of one or more (suitable) fixing agents,
d) winding the fixed yarn, characterized in that the fixing agent or agents are selected from a group consisting of copolyamides, copolyesters, and silicones, and also mixtures or blends thereof.

For the method according to the invention, it is even more advantageous if the yarn made of multifilaments is spread so wide that not more than three filaments (individual filaments, thus endless fibers) overlie one another. In contrast, in EP-A-2 374 923 yarns are provided and said yarns are then treated with an activatable additive or coating, and the ribbon yarn structure is subsequently set by compression. Due to the spreading in the method according to the invention, however, a substantially better degree of distribution of the fixing agent is achieved, by which means a significantly better adhesion occurs, even if no subsequent compression treatment is carried out.

Preferably a thermoplastic copolyamide, especially preferably a copolyamide with a melting point between 120 and 150° C., is used as the fixing agent—in the following also designated as a binder—for forming the matrix. As will be described in more detail below, the introduction preferably takes place in aqueous and/or ethanol suspension or solution.

Alternatively, a reactive silicone, preferably in the form of polysiloxanes, can be used as a thermosetting fixing agent.

Especially well-suited for this purpose are polysiloxanes that contain (unsaturated) vinyl groups in the primary chain or in the side chains. Alternatively, copolyesters can also be used as binders.

It has been shown to be favorable for a series of applications—in particular if silicones are used for the fixing agents—if a yarn made of multifilaments is used from which the finishing agents and sizing agents have been largely removed beforehand.

The removal of the finishing or sizing agents is accomplished by washing processes known per se, but preferably by means of treatment using so-called ramjet washers. A suitable ramjet washer is described for example in EP-B-0711247. The positive effect resulting therefrom is that a washing process can be foregone after the subsequent weaving, because the fabric as such also shows outstanding resistance to burning according to EASC 3.12 or ISO 3795.

In addition, the washing process has the effect that the adhesion with respect to the silicone coating (if this is still required) is improved.

Furthermore, it can be appropriate if the fixed yarn is calendered prior to winding, wherein a heatable roller pair is preferably used for the calendering, but in particular a heatable roller trio is used.

The calendering has the effect, among others, that the ribbon yarn obtained becomes gas- or air-tight and can therefore mean that a coating step of the fabric, which usually takes place later, becomes obsolete due to this "sealing effect". The ribbon yarn becomes "displacement-proof" by means of the calendering.

For the method according to the invention, it is also preferred if the winding of the yarns reinforced by means of the fixing agent is performed without twist.

The yarns used contain preferably multifilaments made of polyamide, copolyamide, or polyester, and/or mixtures thereof. Among the polyamides, the aliphatic polyamides polyamide 6, polyamide 6,6, and polyamide 4,6 are eminently suitable. In principle, the use of aromatic polyamides is also possible of course, for example polyparaphenylene terephthalamide (PPTA).

Among the polyesters, polyethylene terephthalate (PET) and polylactic acid (polylactide, PLA) are especially suitable.

DETAILED DESCRIPTION

Figure 1:
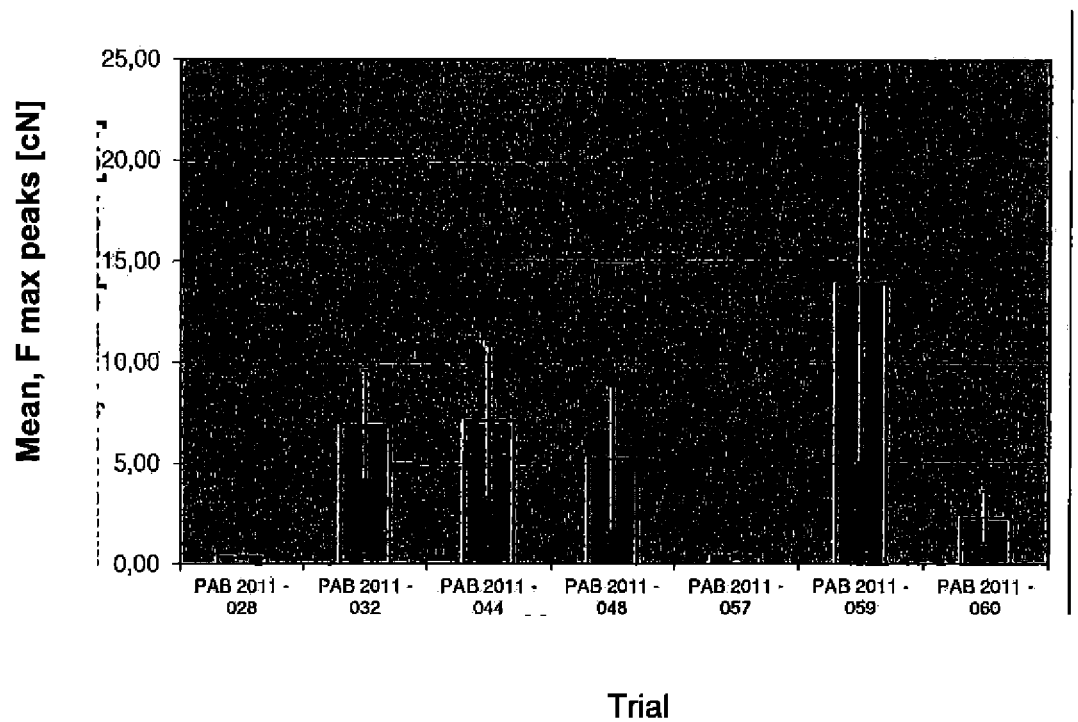
FIG. 1 is a graphical representation of the results shown in Table 3.

The production of the ribbon yarns and the use thereof for e.g. the production of airbag fabrics or tire reinforcements, as well as preferred embodiments, will now be explained in more detail.

A multifilament yarn is provided, for example, spun from polyamide 6,6 with a linear density of 1880 dtex and 280 individual filaments. The multifilament yarn is preferably provided in an unmingled state, i.e. no intermingling jets or other types of intermingling of the yarn are used after the spinning process.

The yarn can then be subjected to a washing process. The washing is recommended, for example, if the fixing step should take place using a reactive silicone, for example, a polysiloxane. The background is that the finishing or sizing agents negatively affect (increase) the burning behavior during later applications, for example as an airbag. If, for example, a copolyamide is used as a binder or fixing agent, then the later burning behavior is surprisingly not increased, even with regard to the fixing of unwashed yarns, that is, yarns that still contain finishing and sizing agents, in comparison to the washed yarns. It is conjectured that the finishing and sizing agent particles are quasi "encapsulated" due to the fixing with the copolyamide as a binder, and in this way can no longer increase the flammability. However, the additional washing step has also proven to be advantageous when using the copolyamides.

As already stated above, it is especially advantageous if the (optional) washing is carried out with the aid of ramjet washers. A drying step can be connected downstream of the washing process. The drying is in turn preferably advised if, for example, a reactive silicone is used as a binder, since polysiloxanes react sensitively to the presence of moisture and phase separation with the water occurs. However, even when using copolyamides as a binder, the drying process can be advantageous, since the uniform application of the fixing agent consisting of aqueous and/or ethanol suspension or solution is occasionally difficult if the multifilament yarn is present in a moist or wet state.

Drying can take place in a manner known per se, for example by using a hot air stream, but drying is preferably in an oven. The drying is carried out to a residual moisture content of less than 5 wt. %, preferably to the equilibrium moisture of the respective multifilament yarn.

After the provision, and, if applicable, washing and drying, the spreading—or also filament separation—of the multifilament yarn takes place. The (individual) filaments forming the multifilament yarn are thereby aligned parallel and side by side—e.g. mechanically by means of pins, such that not more than 5, preferably not more than 3 individual filaments overlie one another.

Thereafter, the application of the fixing agent on the multifilament yarn spread in this way takes place. The application can take place as a forced application in a way known to a person skilled in the art and depends substantially on the consistency and type of the binder, for example, by means of a lick roller, by guiding through an immersion bath, by spraying on with a sprayer, or by a roller.

The applied amount depends on the type of multifilament yarn used and in particular on the later area of use. Depending on the further processing, 0.1 to 30 wt. %, preferably 0.5 to 20 wt. %, more preferably 1 to 10 wt. %, and most preferably 1 to 5 wt. %, relative to the weight of the multifilament yarn, can be used.

The fixing or curing takes place subsequently by means of reaction, residence time, and temperature, and preferably without application of pressure.

If a polysiloxane is used, then it is preferably a cross-linkable silicone from Wacker, which is sold under the name "DEHESIVE 920" or DEHESIVE 971. This product is a mixture containing a reactive polysiloxane, which has vinyl groups within the chains or as side chains, for example $CH_2=CH-(Si(CH_3)_2-O)_n-CH=CH_2$ where n is between 2 and 200, preferably 10 and 100, and more preferably 20 and 50. Further, the mixture contains a short-chain silane (HX) as a cross-linking agent as well as a platinum catalyst (OL). The short-chain silane is able to bind to the vinyl groups of the polysiloxane and thus trigger the cross-linking. The viscosity of the reactive polysiloxane mixture is approximately 500 mPa s.

The special advantage of this reactive polysiloxane lies in the fact that, with respect to a use of the thus-fixed ribbon yarn in the airbag, the subsequent coating with silicone proceeds substantially more easily, since a pre-activation and thus an improved adhesion of the ribbon yarn has already occurred due to this fixing. In the later airbag fabric, the film-forming characteristic is clearly more pronounced due to this, which becomes noticeable in a strongly increased adhesion compared to the conventional airbag coating using silicone rubber.

Surprisingly, the ribbon yarns coated with the reactive silicone have a significantly improved anti-wicking behavior. This makes the ribbon yarns eminently suitable for applications in textile construction, where the wicking effect is highly undesirable. In addition, the ribbon produced using silicone has a surprisingly increased cut resistance during weaving.

A further preferred fixing agent is "VINNAPAS 441", an ethylene vinyl acetate copolymer, likewise sold by Wacker.

Furthermore, copolyamides or copolyesters sold by EMS Chemie under the name "GRILTEX" are preferred as binders. These copolyamides and copolyesters are offered either in aqueous suspension (e.g. Griltex 2A, 40%) or as an ethanol/aqueous solution (e.g. Griltex D 1523A) and can be used in the method according to the invention either directly or diluted to approximately 10 to 20%. Griltex® 2A Copolyamide Hotmelt Adhesive is particularly preferred.

In contrast to the polysiloxane, the activation takes place here using heat, since the copolyamide has a melting point range of approximately 120 to 150° C. The use of the copolyamide has the major advantage that, for example, the airbag fabric contains only one type of material. In addition, it is possible, through a corresponding increase in the concentration, to allow the film formation to take place solely by means of the fixing agent, in that the copolyamide is only remelted after production of the airbag fabric and the film formation is thus triggered.

It is particularly advantageous that the subsequent treatment with silicone rubber for the airbag coating can be omitted. A closed surface is thus already formed on the fabric by the fixing agent.

The copolyamide is used particularly preferably as an aqueous suspension, wherein the particle size of the copolyamide particles should be smaller than 1 µm on the average. In the particularly preferred Griltex 2A, the particle size of 90 vol. % is a maximum of 0.9 µm. This particularly preferred fixing agent is in effect an adhesive, which has, however, particularly good characteristics in the method according to the invention, as can be seen below.

The particularly preferred copolyamide has a melting point range (determined via DSC) of 120-130° C., a glass transition temperature ($T_g$) (determined via DSC) of 17° C., a melt viscosity (mean according to ISO 1133 at 160° C./2.16 kg) of 600 Pa*s, a melt volume rate MVR (mean according to ISO 1133 at 160° C./2.16 kg) of 18 cm$^3$/10 min, a relative viscosity (in 0.5% m-cresol) of 1.47, and a density (determined according to ISO 1183) of 1.05 g/cm$^3$.

Suitable copolyamides and the production thereof are described for example in the embodiments of EP 1 153 957 A2.

The applied amount of copolyamide on the yarns lies preferably in the range from 1 to 10 wt. % and particularly preferably 2-5 wt. %, relative to the yarn amount. As already mentioned, the yarn amount varies depending on the field of application of the ribbon yarn obtained. Thus, it can be appropriate to apply a relatively high amount of the copolyamide if, e.g. it is desired to omit the previously necessary siliconization of the later airbag fabric in order to already achieve the gas-tightness with the aid of the fixing agent and with a subsequent calendering step.

A copolyester likewise sold by EMS Chemie represents a further preferred fixing agent in the method according to the invention, which copolyester is used in particular for multifilament yarns made of polyethylene terephthalate. A binder of this type proves to be eminently suitable, particularly for applications of the thus-fixed ribbon yarns in fabrics that are later coated with PVC, as by this means the isocyanates otherwise needed as adhesion promoters can be omitted.

After the coating and activation, the winding of the ribbon yarns thus obtained takes place. It is hereby recommended that the winding take place without twist in order that the "ribbon character" is not undone again. The winding takes place preferably with the aid of a new type of winder from Sahm, a parallel-bobbin winding machine, model Sahm 460 XE. The bobbin moves during the winding process on this winder, and not the ribbon yarn, in order to prevent twists.

It is advantageous if the ribbon yarn is pre-tensioned by means of a roller pair, or preferably a trio of rollers, prior to winding, on the one hand to perform calendering but even more so to ensure a uniform tension, which should be as low as possible during the fixing step. A uniform tension of this type is also important for the uniform formation of the ribbons. For example, a tension in the range from approximately 50 to 200 g has proven to be favorable for the polyamide multifilament yarn 1880 dtex f 280.

With the aid of the winder and the uniform tension, the desired winding of the ribbon yarn without twist is already largely achieved.

The uniformity of the tension can still be additionally improved by using tension-controlled unwinders. Examples of these are the GAR unwinding creels from Karl Mayer and the Sahm Bitensor 910E unwinding unit from Sahm.

The ribbon yarns produced in this way are distinguished by excellent tenacity (important e.g. for airbags or for tire reinforcement) while simultaneously using significantly less yarn than in conventional methods. By this means, a substantial weight reduction arises, which also results, for example, in the improved packability of the airbag.

In the field of rubber reinforcement, rubber can be saved by the flat geometry of the ribbon, such that, e.g. during use as steel-belt binders in radial tires, the tire becomes lighter and has at the same time a lower rolling resistance, since less rubber can be used between the steel belt and the tread. The parallel orientation of the individual filaments in the ribbon additionally effects a further increase of the modulus in comparison with the conventionally-used tire cord, such that the high-speed performance of the tire is further increased at the same time.

An RFL dip (resorcinol formaldehyde latex dip) can therefore also be used as an additional fixing agent in the method according to the invention. Resorcinol formaldehyde precondensates are known as an adhesion promoting component for rubberized fabrics.

To produce the dip, the precondensate is thereby processed together with the latex dispersions and other ingredients to form so-called resorcinol formaldehyde latex (RFL) dips.

As carcass reinforcement in radial tires, e.g. for airplane tires, these ribbon yarns offer a higher modulus in comparison with cords made of filament yarns.

Likewise, the rubber adhesion or the adhesion to the polyvinyl chloride (PVC) is improved, since the effective adhesive surface is larger and almost all filaments have an adhesive bridge to the rubber. In contrast thereto, in the case of round or twisted yarns, part of the filaments are enclosed in the inside and have no contact/adhesion to the surrounding matrix.

During the production of woven fabrics, the efficacy can be increased, since one can work with a substantially reduced weft insertion.

The weight savings by means of the high surface coverage of the ribbon yarns and the anti-wicking effect show very great advantages for textile construction. Fabrics of this type are also outstandingly suitable for the production of sails.

In addition, the fact that the ribbon yarns have practically no "wicking behavior" enables vastly improved recycling properties, since the addition of often fluorine-containing additives to reduce the wicking effect in conventional fabrics can be omitted.

The invention is likewise directed at ribbon yarns made of multifilament yarns based on polyamide and/or polyester, wherein no more than 5 filaments overlie one another within the ribbon yarn, wherein the ribbon yarn is fixed by the formation of a matrix consisting of one or more (suitable) fixing agents, wherein the fixing agent or agents are selected from a group consisting of copolyamides, copolyesters, and silicones, as well as mixtures and blends thereof.

Preferably, not more than three filaments overlie one another within the ribbon yarn according to the invention.

The ribbon yarn according to the invention has a width (tape width) of at least 3.5 mm. In particular when using polyamide 6,6 filaments and the copolyamide as a fixing agent, particularly preferably "GRILTEX 2A", a good adhesion of the spread individual filaments is achieved in the composite. This is produced by the good thermoplastic moldability of the matrix. At the same time, however, this thermoplastic behavior of the matrix subsequently allows in the fabric for the individual ribbon yarns in the warp and weft to be connected to each other to some degree by applying heat and pressure to the finished fabric, such that the already mentioned sealing effect occurs here, which improves the gas-tightness of the fabric and makes a subsequent coating with e.g. silicone superfluous, or significantly reduces the required amount of coating.

It is particularly advantageous that the resulting ribbon yarn remains flexible in the temperature range of minus 30 to plus 110° C. typical for automobiles.

It was found to be particularly surprising that the flexibility decreased only minimally, even at very low temperatures caused by treatment with liquid nitrogen. This qualifies the ribbon yarn according to the invention for additional applications that take place at extremely low temperatures.

The invention is further directed at airbag fabrics produced from the ribbon yarns according to the invention, wherein said airbag fabrics are produced without the conventionally necessary sizing during the production of the warp and without the conventional washing after the weaving, and, if applicable, can be used directly without the conventionally necessary subsequent coating to achieve gas-tightness.

The invention is to be explained in more detail on the basis of the following examples:

Ribbon yarns made of polyamide filaments having a nominal linear density of 1880 dtex f280 were produced. The textile data for the filaments used is gathered in Table 1. The following meanings apply: LD=linear density (measured), EASF 45 N=elongation at a force of 45 N, EASF 90 N=elongation at a force of 90 N, HAS 5 mN/tex=hot air shrinkage at a pretension of 5 mN/tex (measured at 180° C. for 2 min).

The ribbon yarns obtained from the filaments listed in Table 1 were fixed using different fixing agents. An overview of the fixing agents and the fixing conditions is contained in Table 2.

TABLE 2

| Trial number | Additive | Application | Solvent | Bath temperature | Washing step |
|---|---|---|---|---|---|
| PAB 2011-028 | Delion F-6120(Tret N-103) | 1.06% | Water | 125° C. | No |
| PAB 2011-031 | Griltex 2A | 1.33% | Water | 160° C. | No |
| PAB 2011-032 | Griltex 2A | 1.38% | Water | 160° C. | No |
| PAB 2011-044 | Griltex D1523A GF | 0.96% | Ethanol/water 80:20 | 160° C. | No |
| PAB 2011-048 | Griltex D1523A GF | 0.96% | Ethanol/water 80:20 | 160° C. | Yes |
| PAB 2011-057 | Dehesive 971 | 3.83% | White spirit D40 | 230° C. | Yes |
| PAB 2011-059 | Vinnapas EP 441 | 2.55% | Water | 230° C. | Yes |
| PAB 2011-060 | EP 441/WT 57 | 2.55% | Water | 230° C. | Yes |

Delion F-6120 (polyester wax from Takemoto), Griltex ® 2A and Griltex ® D1523A GF (copolyamides from EMS Chemie AG, business unit: Ems-Griltech, Switzerland), Dehesive ® (silicone from Wacker-Chemie), Vinnapas ® EP 441 (vinyl copolymer from Wacker-Chemie) and Vinnapas ® EP 441/WT 57 (Si/vinyl copolymer blend from Wacker-Chemie) were used.

Determinations of the tear propagation force on the yarns thus obtained were carried out using the trouser test according to DIN EN ISO 13937-2.

The test conditions for the ribbon yarns were as follows: The sample length is 150 mm, of which approximately 40 mm is separated using a needle and the legs are fixed to the test device. The clamping length is 50 mm, the drawing speed is 100 mm/min and the data logging takes place over a 150 mm path.

The tear propagation path is divided into four equal sections from the first to the last recorded peak value. While the first section is not considered, all peak values of the remaining path are evaluated using a force-drop detection of 15% from the peak value (Fmax peak).

The mean, standard deviation, and coefficient of variation were determined from 20 individual determinations (mean of Fmax peak (cN)) per ribbon.

Table 3 shows the results, which are depicted again graphically in FIG. 1.

TABLE 1

| Trial | LD [dtex] | Breaking force [N] | Breaking tenacity [cN/tex] | Elongation at break [%] | EASF 1 45 N [%] | EASF 2 90 N [%] | HAS 5 mN/tex [%] | Work [N * cm] |
|---|---|---|---|---|---|---|---|---|
| 140 HRT | 1922 | 158.67 | 82.56 | 21.11 | 7.43 | 10.86 | 4.59 | 897.01 |
| PAB 2011-028 | 1934 | 156.49 | 80.91 | 19.77 | 7.08 | 10.55 | 5.17 | 818.01 |
| PAB 2011-031 | 1941 | 158.08 | 81.44 | 20.70 | 7.25 | 10.75 | 4.93 | 870.58 |
| PAB 2011-044 | 1930 | 157.45 | 81.58 | 20.45 | 7.06 | 10.50 | 4.95 | 862.42 |
| PAB 2011-048 | 1920 | 157.29 | 81.92 | 20.44 | 7.30 | 10.87 | 5.04 | 848.97 |
| PAB 2011-057 | 2011 | 158.95 | 79.04 | 23.18 | 8.06 | 12.30 | 3.17 | 970.07 |
| PAB 2011-059 | 2007 | 153.95 | 76.71 | 22.01 | 8.84 | 13.13 | 2.83 | 824.99 |
| PAB 2011-060 | 1954 | 157.22 | 80.46 | 21.50 | 7.74 | 11.68 | 3.52 | 877.18 |

TABLE 3

| Trial | PAB 2011-028 Mean Fmax peaks [cN] | Number of peaks | PAB 2011-032 Mean Fmax peaks [cN] | Number of peaks | PAB 2011-044 Mean Fmax peaks [cN] | Number of peaks | PAB 2011-048 Mean Fmax peaks [cN] | Number of peaks | PAB 2011-057 Mean Fmax peaks [cN] | Number of peaks | PAB 2011-059 Mean Fmax peaks [cN] | Number of peaks | PAB 2011-060 Mean Fmax peaks [cN] | Number of peaks |
|---|---|---|---|---|---|---|---|---|---|---|---|---|---|---|
| | 0.35 | 328 | 9.94 | 19 | 6.15 | 29 | 7.88 | 28 | 0.48 | 341 | 23.80 | 18 | 2.54 | 38 |
| | 0.38 | 327 | 6.41 | 25 | 6.16 | 42 | 4.83 | 38 | 0.24 | 382 | 8.66 | 31 | 4.73 | 18 |
| | 0.38 | 329 | 6.05 | 30 | 16.04 | 22 | 1.62 | 96 | 0.41 | 353 | 26.66 | 15 | 1.98 | 47 |
| | 0.33 | 343 | 9.21 | 23 | 12.79 | 27 | 4.90 | 35 | 0.38 | 356 | 29.67 | 19 | 3.06 | 35 |
| | 0.40 | 316 | 5.56 | 36 | 7.88 | 26 | 4.85 | 33 | 0.40 | 355 | 14.32 | 11 | 6.23 | 14 |
| | 0.43 | 329 | 3.42 | 49 | 10.08 | 25 | 2.33 | 83 | 0.31 | 383 | 8.04 | 29 | 1.60 | 84 |
| | 0.36 | 351 | 6.76 | 24 | 10.15 | 27 | 6.37 | 50 | 0.60 | 372 | 3.47 | 57 | 2.29 | 71 |
| | 0.33 | 355 | 4.54 | 42 | 3.49 | 44 | 2.74 | 73 | 0.49 | 324 | 10.64 | 25 | 2.03 | 85 |
| | 0.52 | 302 | 9.40 | 21 | 7.21 | 29 | 1.15 | 131 | 0.34 | 360 | 23.28 | 23 | 2.02 | 92 |
| | 0.38 | 342 | 4.66 | 33 | 4.19 | 41 | 12.18 | 31 | 0.34 | 370 | 28.90 | 19 | 1.21 | 165 |
| | 0.28 | 355 | 12.54 | 14 | 10.41 | 24 | 13.86 | 16 | 0.68 | 280 | 6.20 | 43 | 1.16 | 138 |
| | 0.27 | 339 | 2.42 | 73 | 4.91 | 29 | 3.06 | 58 | 0.44 | 358 | 6.69 | 32 | 2.74 | 67 |
| | 0.50 | 293 | 5.88 | 34 | 3.78 | 43 | 8.31 | 32 | 0.23 | 392 | 12.85 | 17 | 1.16 | 149 |
| | 0.32 | 335 | 10.82 | 20 | 3.16 | 51 | 4.09 | 43 | 0.59 | 301 | 17.97 | 16 | 2.66 | 58 |
| | 0.28 | 359 | 8.82 | 18 | 4.92 | 31 | 10.16 | 29 | 0.25 | 380 | 21.57 | 16 | 1.24 | 128 |
| | 0.37 | 340 | 8.89 | 19 | 1.82 | 89 | 3.53 | 51 | 0.22 | 388 | 8.80 | 27 | 1.16 | 146 |
| | 0.20 | 374 | 5.12 | 41 | 2.38 | 78 | 1.02 | 159 | 0.30 | 366 | 8.17 | 35 | 1.09 | 149 |
| | 0.22 | 364 | 6.41 | 28 | 11.77 | 23 | 3.76 | 39 | 0.19 | 399 | 11.96 | 29 | 2.63 | 65 |
| | 0.26 | 247 | 3.46 | 54 | 6.63 | 28 | 5.27 | 34 | 0.51 | 333 | 1.47 | 174 | 2.54 | 62 |
| | 0.30 | 357 | 7.24 | 24 | 8.43 | 27 | 2.78 | 46 | 0.26 | 386 | 5.18 | 37 | 2.77 | 51 |
| n = 20 | | | | | | | | | | | | | | |
| Mean | 0.34 | 334 | 6.88 | 31 | 7.12 | 37 | 5.23 | 55 | 0.38 | 359 | 13.92 | 34 | 2.34 | 83 |
| s | 0.08 | | 2.69 | | 3.81 | | 3.59 | | 0.14 | | 8.84 | | 1.28 | |
| V | 24.2 | | 39.15 | | 53.48 | | 68.5 | | 35.32 | | 63.53 | | 54.61 | |

Figure 2:
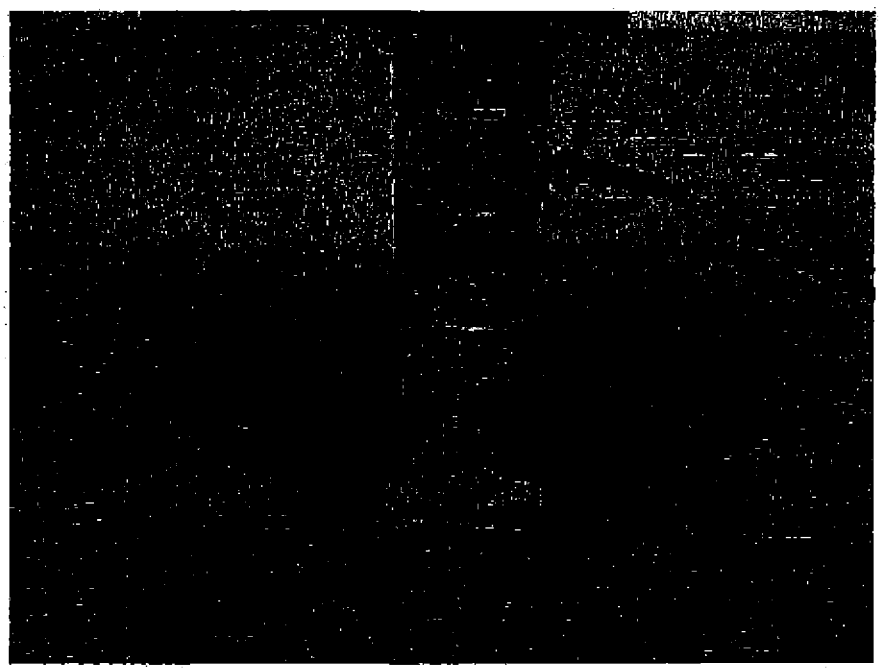
FIG. 2 is an image of the device used to determine the flexural strength of the fixed ribbon yarns.

The flexural strength of the fixed ribbon yarns was determined in the laboratory based on ASTM D 4043. The test device is shown in FIG. 2.

The device parameters were as follows:

| | |
|---|---|
| Sample size: | 10 parallel fibers |
| Length: | 50 mm plus approximately 5 mm right and left for yarn fixing |
| Width: | Approx. 10 mm |
| Support width: | 25 mm |
| $L_0$ = | 10 mm (Distance of the pressure pad from the support height) |
| Lmax = | 25 mm Travel and test path |
| V = | 500 mm/min Test speed |

The results are summarized in Table 4.

TABLE 4

| Trial number | Flexural strength F max cN | s | v |
|---|---|---|---|
| PAB 2011-028 | 177 | 0.3 | 17.04 |
| PAB 2011-031 | 1.63 | 0.29 | 17.87 |
| PAB 2011-032 | 1.58 | 0.16 | 10.16 |
| PAB 2011-044 | 4.28 | 0.81 | 18.91 |
| PAB 2011-048 | 3.03 | 0.24 | 8.04 |
| PAB 2011-057 | 2.73 | 0.49 | 17.8 |
| PAB 2011-059 | 4.38 | 0.05 | 1.07 |
| PAB 2011-060 | 3.39 | 0.18 | 5.23 |

To determine the temperature resistance and temperature behavior of the ribbon yarns according to the invention, the basic yarn EN 140 HRT, dtex 1880f280, and the ribbon yarn based thereon with the 1.8% copolyamide 2A application were tested.

Tenacity and elongation at break were tested in a typical automobile temperature range at −35° C., 23° C., 85° C., and 110° C. using a Zwick universal testing machine with a temperature chamber, based on ISO 2062 (yarn) or DIN EN ISO 13934 (fabrics). In deviation from the ISO standard, the clamping length of the test specimens was 250 mm instead of 500 mm. In each case, the means from five determinations are shown.

TABLE 5

EN 140 HRT, dtex 1880f280, bobbin 47 - basic yarn

| Temp ° C. | BF N | EASF 11.3 N % | BT cN/tex | EAB % | E-mod. cN/tex | W BF J | W_BT J/tex | W BT N*mm/(tex*g/cm3) |
|---|---|---|---|---|---|---|---|---|
| −35 | 180.5 | 0.8 | 96.0 | 16.6 | 665 | 3.602 | 0.019 | 17.0 |
| 23 | 153.0 | 1.3 | 81.4 | 20.2 | 449 | 4.043 | 0.022 | 19.0 |
| 85 | 129.4 | 1.9 | 68.8 | 19.8 | 312 | 3.324 | 0.018 | 15.4 |
| 110 | 116.5 | 2.9 | 62.0 | 20.1 | 195 | 3.095 | 0.016 | 14.6 |

TABLE 6

Ribbon yarn with 1.8% Griltex 2A, bobbin, 256

| Temp ° C. | BF N | EASF 11.3 N % | BT cN/tex | EAB % | E-mod. cN/tex | W BF J | W_BT J/tex | W BT N*mm/(tex*g/cm3) |
|---|---|---|---|---|---|---|---|---|
| −35 | 180.5 | 0.8 | 96.0 | 16.6 | 665 | 3.602 | 0.019 | 17.0 |
| 23 | 154.9 | 1.2 | 82.4 | 20.7 | 480 | 4.328 | 0.023 | 20.4 |
| 85 | 131.8 | 1.8 | 70.1 | 20.4 | 319 | 3.632 | 0.019 | 16.9 |
| 110 | 118.6 | 2.7 | 63.1 | 20.8 | 199 | 3.319 | 0.018 | 15.6 |

BF=Breaking force, EASF=Elongation at specific force, BT=Breaking tenacity

EAB=Elongation at break,

W BF=Working capacity, W BT=specific working capacity

Figure 3:
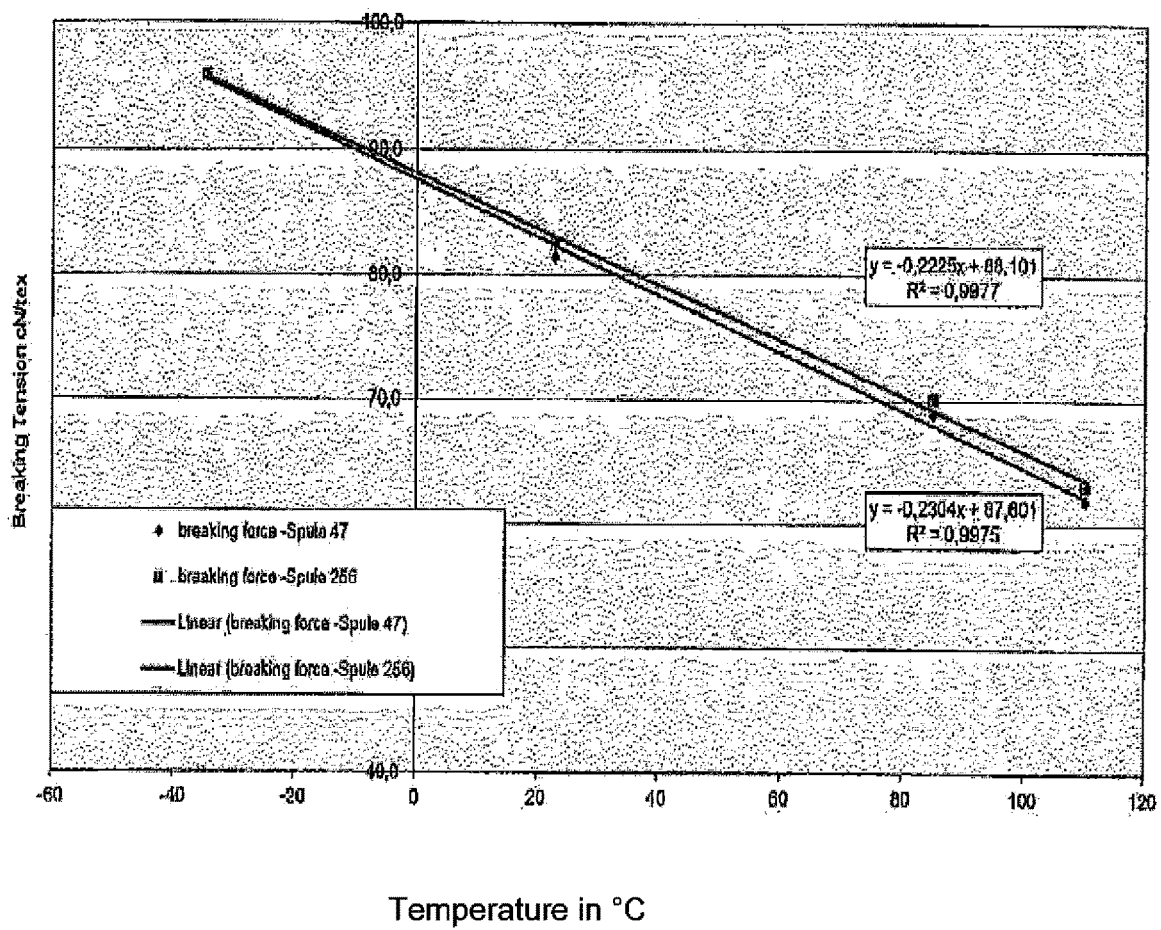
FIG. 3 is a graphical representation of breaking tension at different temperatures.

It can be gathered from Tables 5 and 6 that tenacity (see also FIG. 3), elastic modulus, and working capacity decrease with increasing temperature and indeed to the same extent for the original yarn and for the ribbon yarn according to the invention. This means that, despite all the advantages—in particular in view of the weight savings when using the ribbon yarn—no disadvantages must be accepted when using the copolyamide.

The elongation behavior increases somewhat with increasing temperature, but not significantly. In particular, the behavior at negative temperatures is also still quite acceptable.

Subsequently, a woven fabric produced from ribbon yarn with a 1.8% copolyamide 2A application based on EN140HR, dtex 1880f280, with a structure of 4.4 fibers/cm in the plain weave conventional for airbags, was tested in the same way. The respective means from four determinations are shown.

TABLE 7

Ribbon yarn with 1.8% Griltex 2A, bobbin 256

| Temp °C. | Width mm | Breaking force N | Elongation at break % |
|---|---|---|---|
| −34.0 | 50 | 3841 | 20.0 |
| 22.8 | 50 | 3206 | 23.2 |
| 85.0 | 50 | 2718 | 23.4 |
| 110.0 | 50 | 2461 | 23.4 |

The fabric produced from the ribbon yarn according to the invention behaves according to the yarn: the strength decreases with increasing temperature, and the elongation increases slightly.

The invention claimed is:

1. A method for producing a ribbon yarn comprising:
   spreading a yarn made of multifilament such that not more than five filaments overlie one another, wherein
      the multifilament are based on polyamide and/or polyester, and
      the individual filaments forming the multifilament yarn are aligned parallel and are side-by-side,
   fixing the yarn by forming a matrix comprising one or more fixing agents,
      wherein at least one of the one or more fixing agents are selected from a group consisting of copolyamides, copolyesters, silicones, a copolyamide in aqueous suspension or as an ethanol/aqueous solution, and mixtures or blends thereof,
      and wherein an amount of the applied one or more fixing agents is in a range of from 0.1 wt. % to 30 wt. % relative to the weight of the multifilament yarn, and
   optionally winding the fixed yarn,
   wherein the ribbon yarn is suitable for forming an airbag.

2. The method according to claim 1, wherein the spreading is performed such that not more than three filaments overlie one another.

3. The method according to claim 1, wherein at least one of the one or more fixing agents comprises a copolyamide in aqueous suspension or as an ethanol/aqueous solution, and the at least one of the one or more fixing agents that comprises the copolyamide in aqueous suspension or as the ethanol/aqueous solution is applied either directly or is diluted to a suspension or a solution comprising approximately 10 to 20% of the at least one of the one or more fixing agents that comprises the copolyamide in aqueous suspension or as the ethanol/aqueous solution before the applying.

4. The method according to claim 3, wherein the copolyamide is an adhesive with an average particle size of less than 1 μm.

5. The method according to claim 1, wherein a reactive silicone is used as the one or more fixing agents.

6. The method according to claim 1, wherein before the spreading, the method further comprises substantially removing finishing and sizing agents from the yarn made of multifilament.

7. The method according to claim 1, wherein the method comprises winding the fixed yarn, and the fixed yarn is calendered prior to the winding.

8. The method according to claim 7, wherein the winding is carried out without twist.

9. The method according to claim 1, wherein the matrix consists of the one or more fixing agents.

10. A method for producing a ribbon yarn consisting essentially of:
   spreading a yarn made of multifilament such that not more than five filaments overlie one another, wherein
      the multifilament are based on polyamide and/or polyester,
      fixing the yarn by forming a matrix comprising one or more fixing agents, wherein at least one of the one or more fixing agents are selected from a group consisting of copolyamides, copolyesters, silicones, a copolyamide in aqueous suspension or as an ethanol/aqueous solution, and mixtures or blends thereof, and
      an amount of the applied one or more fixing agents is in a range of from 0.1 wt. % to 30 wt. % relative to the weight of the multifilament yarn, and
   optionally winding the fixed yarn,
   wherein the ribbon yarn is suitable for use in producing an airbag.

* * * * *